(12) United States Patent
Frank (10) Patent No.: US 8,527,466 B2
(45) Date of Patent: Sep. 3, 2013

(54) HANDLING TEMPORARY FILES OF A VIRTUAL MACHINE

(75) Inventor: Shahar Frank, Ramat Hasharon (IL)

(73) Assignee: Red Hat Israel, Ltd., Raanana (IL)

( * ) Notice: Subject to any disclaimer, the term of this patent is extended or adjusted under 35 U.S.C. 154(b) by 398 days.

(21) Appl. No.: 12/475,543

(22) Filed: May 31, 2009

(65) Prior Publication Data

US 2010/0306173 A1 Dec. 2, 2010

(51) Int. Cl.
*G06F 17/30* (2006.01)

(52) U.S. Cl.
USPC .......................................... 707/650

(58) Field of Classification Search
USPC .......................................... 707/605
See application file for complete search history.

(56) References Cited

U.S. PATENT DOCUMENTS

| | | | |
|---|---|---|---|
| 6,681,348 B1 | 1/2004 | Vachon | |
| 6,854,115 B1 | 2/2005 | Traversat et al. | |
| 7,529,897 B1 | 5/2009 | Waldspurger et al. | |
| 7,899,788 B2 | 3/2011 | Chandhok et al. | |
| 7,925,923 B1 | 4/2011 | Hyser et al. | |
| 8,019,789 B2 | 9/2011 | Dahms et al. | |
| 8,024,566 B2 | 9/2011 | Stanev | |
| 8,041,887 B2 | 10/2011 | Ito | |
| 8,060,476 B1 | 11/2011 | Afonso et al. | |
| 8,156,492 B2 | 4/2012 | Dahlstedt | |
| 8,365,020 B2 | 1/2013 | Laor | |
| 2002/0029359 A1 | 3/2002 | Kiyoi et al. | |
| 2004/0088415 A1* | 5/2004 | Chandrasekar et al. | 709/226 |
| 2006/0026585 A1* | 2/2006 | Haselden et al. | 717/168 |
| 2006/0143534 A1 | 6/2006 | Dall | |
| 2007/0006226 A1 | 1/2007 | Hendel | |
| 2007/0112812 A1* | 5/2007 | Harvey et al. | 707/101 |
| 2007/0192329 A1* | 8/2007 | Croft et al. | 707/10 |
| 2007/0226443 A1 | 9/2007 | Giampaolo | |
| 2007/0255926 A1 | 11/2007 | Chuang et al. | |
| 2007/0271610 A1 | 11/2007 | Grobman | |
| 2008/0098161 A1 | 4/2008 | Ito | |
| 2008/0127348 A1* | 5/2008 | Largman et al. | 726/24 |
| 2008/0162760 A1 | 7/2008 | Jacob | |
| 2008/0163008 A1 | 7/2008 | Jacob | |
| 2009/0157942 A1 | 6/2009 | Kulkarni | |
| 2009/0172409 A1 | 7/2009 | Bullis et al. | |
| 2009/0228743 A1 | 9/2009 | Ponnuswamy | |
| 2009/0234987 A1 | 9/2009 | Lee et al. | |
| 2009/0248949 A1 | 10/2009 | Khatri et al. | |
| 2010/0083250 A1 | 4/2010 | Nakai | |
| 2010/0235831 A1* | 9/2010 | Dittmer | 718/1 |

(Continued)

OTHER PUBLICATIONS

Qumranet, Solid ICE™, Connection Broker, Apr. 2008, 7 pages.

(Continued)

*Primary Examiner* — Bai D. Vu
(74) *Attorney, Agent, or Firm* — Lowenstein Sandler LLP (57) ABSTRACT

A method and system for handling temporary data of a virtual machine are described. In one embodiment, virtual machines are hosted by a server and accessed by remote clients over a network. The server assigns first storage and second storage to each virtual machine, where the first storage is designated for temporary data of a respective virtual machine and the second storage is designated for persistent data of a respective virtual machine. The server monitors events pertaining to the virtual machine. Upon detecting a predefined event pertaining to one of the virtual machines, the server causes at least a subset of the temporary data to be removed from the first storage of this virtual machine.

20 Claims, 5 Drawing Sheets

(56) References Cited

U.S. PATENT DOCUMENTS

2010/0251219 A1 9/2010 Peacock et al.
2010/0280997 A1* 11/2010 Lillibridge et al. ........... 707/652
2010/0306770 A1 12/2010 Frank
2011/0154133 A1 6/2011 Ganti et al.
2011/0231710 A1 9/2011 Laor

OTHER PUBLICATIONS

Qumranet, KVM-Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Vitrual Desktop Server (VDS), Apr. 2008, 6 pages.
USPTO, Office Action for U.S. Appl. No. 12/726,825, mailed Apr. 22, 2011.
USPTO, Final Office Action for U.S. Appl. No. 12/726,825 mailed Sep. 2, 2011.
USPTO, Advisory Action for U.S. Appl. No. 12/726,825 mailed Nov. 7, 2011.
USPTO, Office Action for U.S. Appl. No. 12/726,825, mailed Jan. 5, 2012.
USPTO, Final Office Action for U.S. Appl. No. 12/726,825 mailed Apr. 2012.
USPTO, Advisory Action for U.S. Appl. No. 12/726,825 mailed Jun. 28, 2012.
USPTO, Notice of Allowance for U.S. Appl. No. 12/726,825 mailed Sep. 20, 2012.
USPTO, Office Action for U.S. Appl. No. 12/475,540 mailed Dec. 21, 2011.
USPTO, Final Office Action for U.S. Appl. No. 12/475,540, mailed May 1012.

* cited by examiner

HANDLING TEMPORARY FILES OF A VIRTUAL MACHINE

TECHNICAL FIELD

Embodiments of the present invention relate to management of virtual machines, and more specifically, to handling temporary files of virtual machines.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

In some systems, the host is a centralized server that is partitioned into multiple virtual machines to provide virtual desktops to the users. The centralized host manages the allocation of disk storage to the virtual machines. Some hosts pre-allocate a fixed amount of disk storage to each virtual machine. However, a virtual machine often expands and outgrows the pre-allocated storage space. One reason for the expansion is a growing number of temporary files created by a virtual machine. In a non-virtualized environment, when a machine shuts down, temporary files are automatically discarded. In a virtualized environment, however, there is no efficient mechanism for removing temporary files created by virtual machines. As a result, the accumulation of the temporary files in the disk storage can affect the performance of virtual machines and reduce the speed of disk backup operations.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

A method and system for handling temporary files of virtual machines are described. Virtual machines may be hosted by a server and accessed by remote clients over a network. Each virtual machine is configured to write temporary files to a separate storage device. The server monitors events pertaining to various virtual machines. Upon detecting a predefined event pertaining to one of the virtual machines, the server causes temporary files of this virtual machine to be removed from a corresponding storage device.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "deleting", "de-allocating", "linking", "modifying", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
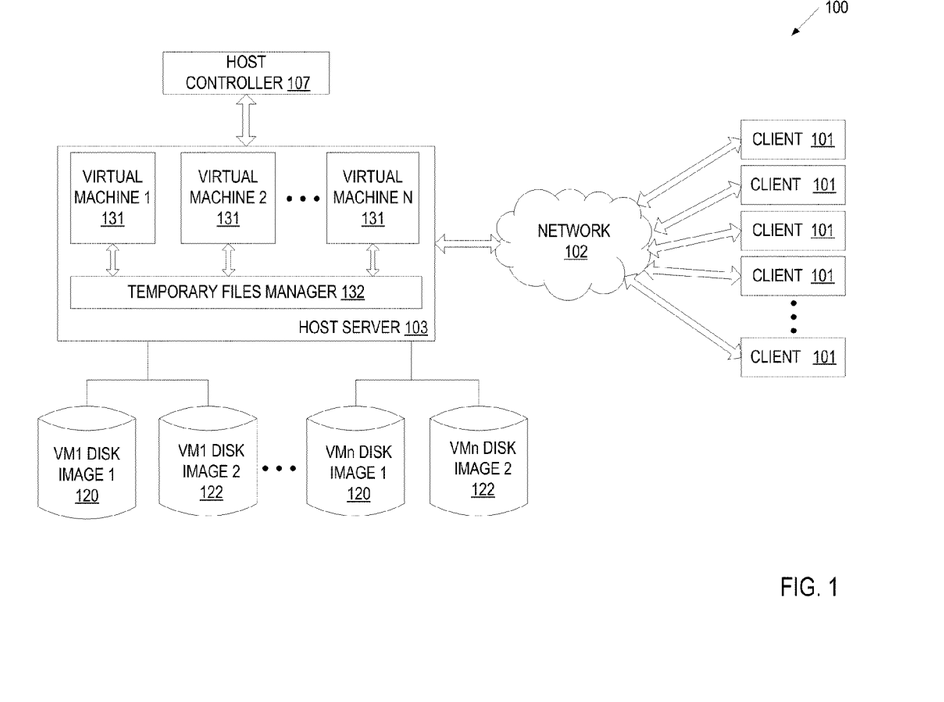
FIG. 1 illustrates an exemplary network architecture in which embodiments of the present invention may operate.

FIG. 1 illustrates an exemplary network architecture 100 in which embodiments of the present invention may operate. The network architecture 100 may include a host 103 coupled to one or more clients 101 over a network 102. The network 102 may be a private network (e.g., a local area network (LAN), wide area network (WAN), intranet, etc.) or a public network (e.g., the Internet). The host 103 may be coupled to a host controller 107 (via a network or directly). Alternatively, the host controller 107 may be part of the host 103.

In one embodiment, the clients 101 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host 103 and re-direct the received data to a display or other user interface.

In one embodiment, the host 103 includes a server or a cluster of servers to run one or more virtual machines 131. Each virtual machine 131 runs a guest operating system (OS) that may be different from one another. The guest OS may include Microsoft Windows, Linux, Solaris, Mac OS, etc. The host 103 may include a hypervisor (not shown) that emulates the underlying hardware platform for the virtual machines 131. The hypervisor may also be known as a virtual machine monitor (VMM), a kernel-based hypervisor or a host operating system.

Each virtual machine 131 can be accessed by one or more of the clients 101 over the network 102. In one scenario, the virtual machine 131 can provide a virtual desktop for the client 101. The virtual machines 131 can be managed by the host controller 107. The host controller 107 may also add a virtual machine, delete a virtual machine, balance the load on the server cluster, provide directory service to the virtual machines 131, and perform other management functions.

The host 103 may also be coupled to data stores hosting images 120 and 122 of storage devices (e.g., disks) that store data of the virtual machines 131. These storage devices may be part of local storage of the host 103 or remote storage (e.g., a storage area network (SAN) or network attached storage (NAS)) coupled to the host 103. The data stores (e.g., repositories) hosting images 120 and 122 may reside on a single or multiple storage devices that may also be part of local storage of the host 103 or remote storage coupled to the host 103. Images 120 and 122 of an individual virtual machine may be stored in one repository or different repositories. In addition, if a virtual machine has two or more users, a separate set of images 120, 122 may be associated with each individual user and may be stored in a single repository or different repositories.

During operation, virtual machines 131 may create persistent data such as user profiles, database records, word processing documents, etc. In addition, guest operating systems and applications of virtual machines 131 often create temporary files such as temporary Internet files created by a web browser or an email utility application. Some of these temporary files (e.g., cached web pages, cached video and audio files, etc.) are not getting deleted when a respective program is closed. The temporary files left behind by the programs accumulate over time and can take up a significant amount of storage space.

Embodiments of the present invention address the above problem by assigning, to each virtual machine 131, one or more disks designated for persistent data and a separate disk designated for temporary files. The disks designated for persistent data and the disks designated for temporary files may be of two different types. In particular, the disks designated for temporary files may use a significantly cheaper and less redundant storage due to the short-lived nature of their contents.

In FIG. 1, images of disks designated for persistent data are shown as virtual machine (VM) disk images 1 (images 122), and images of disks designated for temporary files are shown as VM disk images 2 (images 120). In one embodiment, the guest operating system of each virtual machine 131 is configured to use VM disk images 122 for write operations associated with persistent data and to use VM disk images 120 for write operations pertaining to temporary files. The temporary files are then periodically removed from VM disk images 120 by a temporary files manager 132 of the host 103.

The temporary files manager 132 may be part of the hypervisor or be controlled by the hypervisor. The temporary files manager 132 may monitor events pertaining to individual virtual machines 131 (e.g., a shutdown event, a restart event, a stand by event, a hibernate event, a hard reboot event, a soft reboot event, etc.). Upon detecting a predefined event (e.g., a shutdown or restart event) pertaining to a specific virtual machine, the temporary files manager 132 causes the temporary files of this virtual machine to be removed from a respective disk. For example, the temporary files manager 132 may delete a disk image 120 of this virtual machine and create a new disk image 120 for this virtual machine. Alternatively, the temporary files manager 132 may first select the temporary files to be removed (e.g., based on the age of a temporary file, the date a temporary file was last modified or accessed, etc.), and then remove the selected temporary files.

During a backup or archive operation, the host 103 creates copies of VM disk images 122 but not VM disk images 120. In addition, when creating a new virtual machine that is similar to an existing virtual machine 131, the host 103 does not use the VM disk image 120 for cloning.

With embodiments of the present invention, the amount of storage space utilized by the virtual machines is substantially reduced, and the speed of disk backup operations is improved. In addition, by using a cheaper storage for disks designated for temporary files, the overall cost of storage devices utilized by the virtual machines is significantly reduced.

Figure 2:
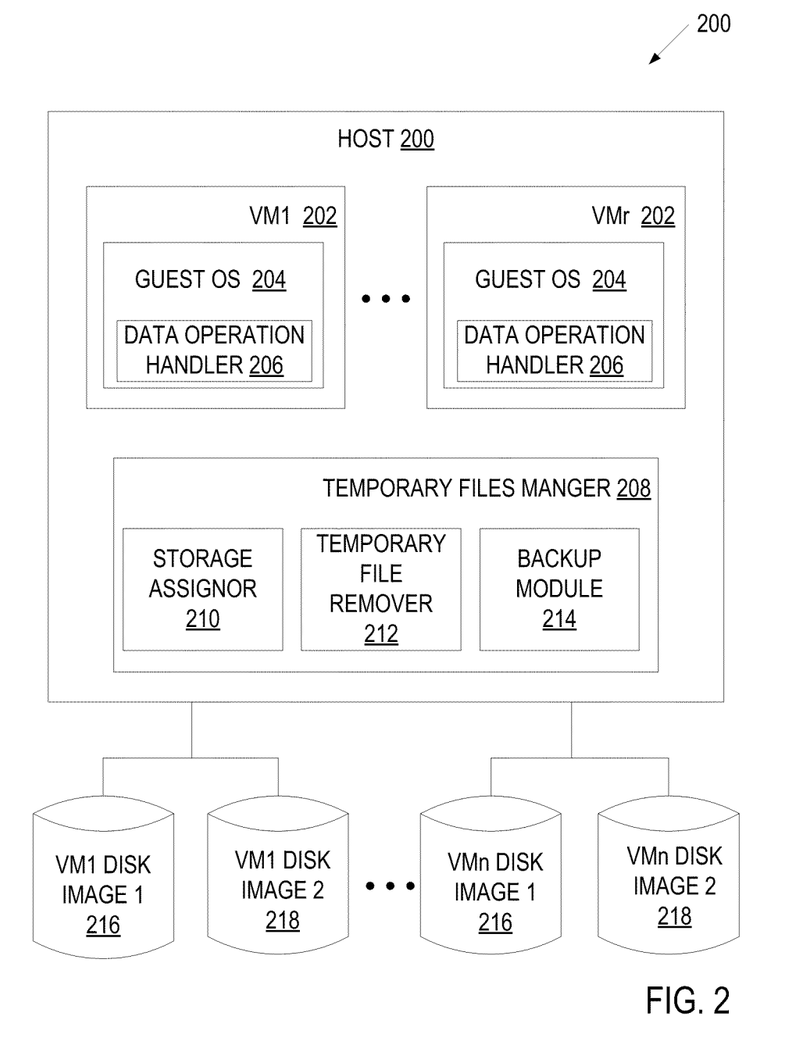
FIG. 2 is a block diagram illustrating one embodiment of a virtual machine and a temporary files manager.

FIG. 2 is a block diagram of one embodiment of a host 200 that may represent a server or a cluster of servers hosting virtual machines 202. Each virtual machine 202 includes a guest operating system (OS) 204. The guest operating systems 204 can be any operating systems, such as Microsoft Windows, Linux, Solaris, Mac OS, etc. Each guest OS 204 manages a file system for its associated virtual machine 202.

In one embodiment, each guest OS 204 is configured to use a VM disk image 216 for write operations associated with temporary files, and to use a VM disk image 218 for write operations associated with persistent data.

As an example, a Linux guest OS may be configured to format the new file system on the hard drive/partition designated for temporary files using the command "mkfs.ext3 /dev/sdb," where "/dev/sdb" represents the storage device designated for temporary data. This command can be optionally used when there is a need to wipe the temporary data each boot. In one embodiment, the temporary data is wiped at least once, either within the guest OS or outside the guest OS. A Linux guest OS may also be configured to create a replacement of existing temporary data directories in the separate storage device designated for temporary data. For example, for /temp directory, the following commands can be used: "mkdir -p /tempdisk," "mount /dev/sdb /tempdisk," "mkdir /tempdisk/tmp," "chmod 1777 /tempdisk/tmp," and "ln -nfs /tmp /tempdisk/tmp." Similarly, for /var/tmp directory, the following commands can be used: "mkdir -p /tempdisk/vartmp," "chmod 1777 /tempdisk/vartmp," and "ln -nfs /var/tmp tempdisk/vartmp." A similar approach can also be used to other temporary data directories to the storage device designated for temporary data. In addition, the temporary data directories can be redirected using the Linux "mount -bind" command. It should be further noted that the above commands are provided only for the purpose of illustration; various other approaches can be used to provide the described functionality without loss of generality.

The guest OS 204 may include a data operation handler 206 that receives a data operation request (e.g., from the guest IS 204 or an application of the virtual machine 202), and determines whether this request pertains to a temporary file. A data operation request pertaining to a temporary file may be a write request (e.g., create a new temporary file, update an existing temporary file or delete a temporary file), or a read request to read a temporary file. If the data operation handler 206 determines that the requested data operation pertains to a temporary file, it performs the requested data operation using the VM disk image 216. If the data operation handler 206 determines that the requested data operation pertains persistent data, it performs the requested data operation using the VM disk image 218.

The host 200 includes a hypervisor (not shown) that manages the virtual machines 202. The hypervisor may contain or otherwise control a temporary files manager 208. The temporary files manager 208 may include a storage assignor 210, a temporary file remover 212, and a backup module 214. Alternatively, some or all of the above components may be external to the temporary files manager 208 and may communicate with the temporary files manager 208 via a network or a local means.

The storage assignor 210 allocates storage to a virtual machine being added to the host 200. In particular, the storage assignor 210 assigns, to the virtual machine, one or more disks designated for persistent data and one or more disks designated for temporary files. Images (218, 216) of these disks are maintained in a single repository or separate repositories accessible to the temporary files manager 208. In one embodiment, the storage assignor 210 provides a user interface allowing a user (e.g., a system administrator) to assign the above disks to a new virtual machine. Alternatively, the disks are assigned to a new virtual machine automatically.

The temporary file remover 212 monitors events pertaining to individual virtual machines to detect predefined events that trigger cleaning of temporary files. The predefined events may be specified by a system administrator (e.g., via a user interface) or hard-coded. Upon detecting a predefined event (e.g., a shut down or restart event) pertaining to a specific virtual machine, the temporary file remover 212 causes the temporary files of this virtual machine to be removed from a respective disk. The removal can be accomplished by deleting a disk image 216 of the virtual machine and creating a new disk image 216 for this virtual machine, or by removing a subset of temporary files from the disk image 216 of the virtual machine. The subset of temporary files to be removed can be determined based on, for example, the age of a temporary file, the date a temporary file was last modified or accessed, etc.

The backup module 214 manages backups and archives of the storage utilized by the virtual machines 202 by including disk images 218, but not disk images 216, in backup and archive operations.

Figure 3:
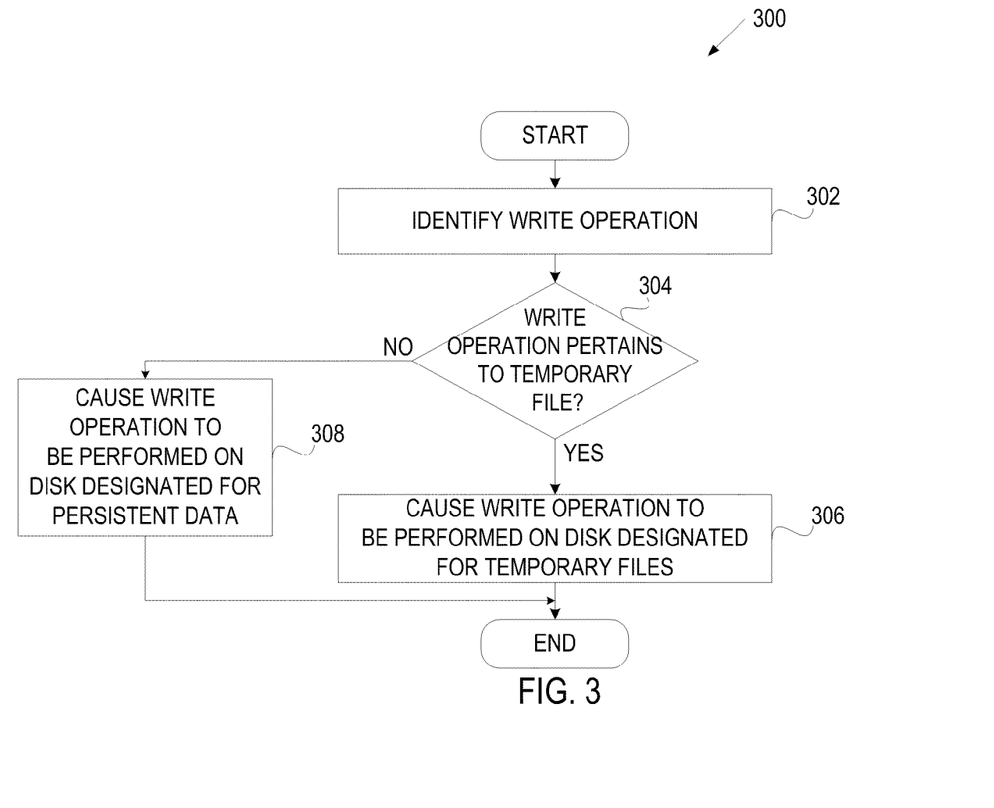
FIG. 3 is a flow diagram illustrating a method for handling temporary files by a guest operating system, in accordance with one embodiment of the present invention.

FIG. 3 is a flow diagram illustrating one embodiment of a method 300 for handling temporary files by a guest operating system of a virtual machine. The method 300 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 300 is performed by a guest operating system 204 of a virtual machine 202 (FIG. 2).

Referring to FIG. 3, the method 300 begins with processing logic identifying a write operation request (block 302). The write operation request may be a request of a guest operating system or an application of a virtual machine. The write operation request may be a request to add new data, update existing data or delete existing data.

At block 304, processing logic determines whether the requested write operation pertains to a temporary file. If so, processing logic causes the write operation to be performed on a disk designated for temporary files of the virtual machine (block 306). In particular, depending on the requested write operation, processing logic adds a new temporary file to an image of the disk designated for temporary files, updates an existing temporary file in the image of the disk designated for temporary files or deletes an existing temporary file from the image of the disk designated for temporary files.

Alternatively, if processing logic determines at block 304 that the requested write operation pertains to persistent data, processing logic causes the write operation to be performed on a disk designated for persistent data of the virtual machine (block 308).

Figure 4:
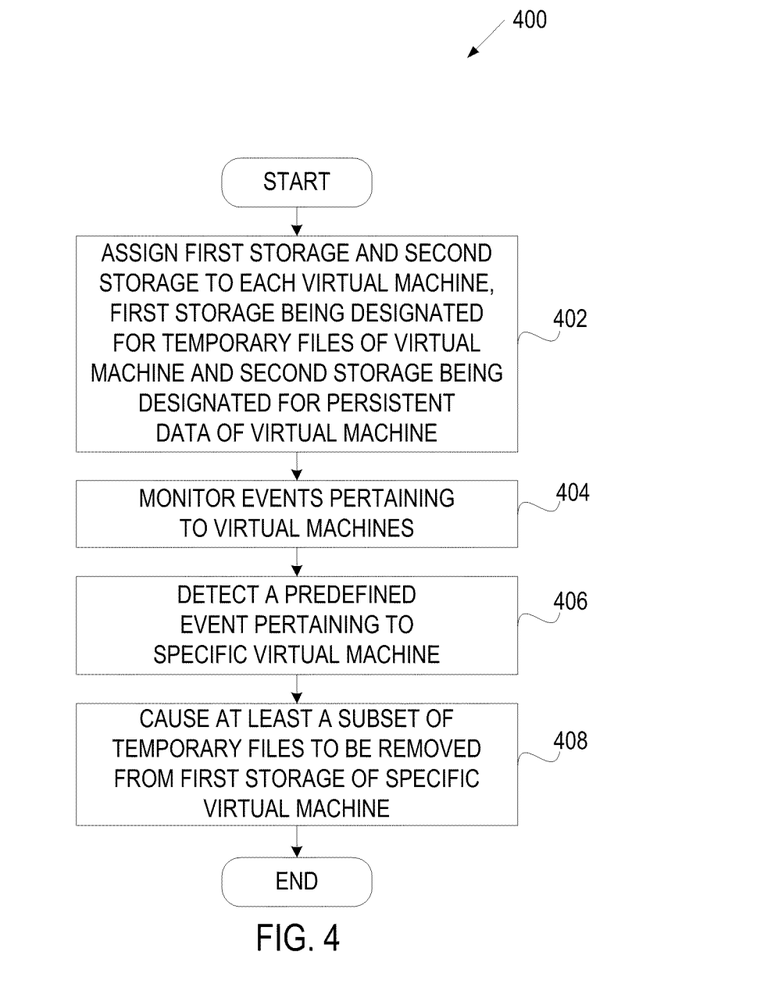
FIG. 4 is a flow diagram illustrating a server-based method for managing temporary files of virtual machines, in accordance with one embodiment of the present invention.

FIG. 4 is a flow diagram illustrating one embodiment of a method 400 for managing temporary files of virtual machines. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the temporary files manager 132 on the host 103 (FIG. 1).

Referring to FIG. 4, method 400 begins with processing logic assigning a first storage and a second storage to each virtual machine being added to the host (block 402). As discussed above, the first storage is designated for temporary files of a respective virtual machine and the second storage is designated for persistent data of a respective virtual machine. The first storage may be cheaper and require less redundancy than the second storage.

At block 404, processing logic monitors events pertaining to the virtual machines running on the host (e.g., shutdown events, restart events, stand by events, hibernate events, hard reboot events, soft reboot events, etc.). At block 406, processing logic detects a predefined event (e.g., restart or shutdown) pertaining to one of the virtual machines. The event indicates that cleaning of the temporary files of the above virtual machine should take place.

At block 408, processing logic causes at least a subset of temporary files of the above virtual machine to be removed from the first storage of this virtual machine. In particular, processing logic can delete a disk image of the first storage of this virtual machine, and create a new disk image for the first storage of the virtual machine. Alternatively, processing logic can identify (e.g., based on the age of at temporary file, the data it was last modified, etc.) a subset of temporary files of the virtual machine that should be removed, and then delete this subset from the image of the first storage of the virtual machine.

Figure 5:
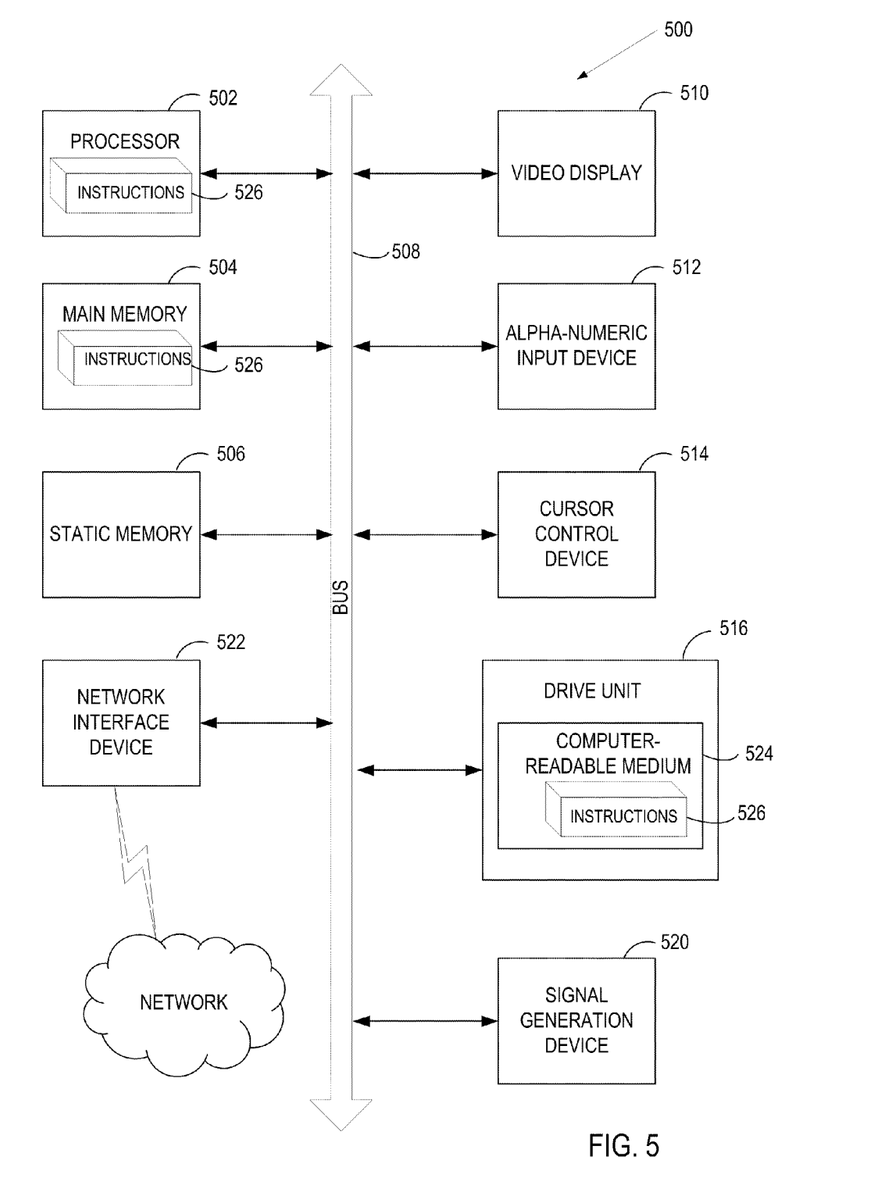
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server (e.g., the host 103) or a client machine (e.g., the client 101) in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 516 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., processing logic 526) embodying any one or more of the methodologies or functions described herein. The processing logic 526 may also reside, completely or at least partially, within the main memory 504 and/or within the processing device 502 during execution thereof by the computer system 500, the main memory 504 and the processing device 502 also constituting machine-readable storage media. The processing logic 526 may further be transmitted or received over a network via the network interface device 522.

The machine-readable storage medium 524 may also be used to store the temporary files manager 132 of FIG. 1. While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
  identifying, by a virtual machine, a write operation requested by a guest operating system of the virtual machine or an application of the virtual machine;
  determining, by the virtual machine, whether the write operation requested by the guest operating system or the application of the virtual machine pertains to a temporary file or persistent data;
  if the write operation requested by the guest operating system or the application of the virtual machine pertains to the temporary file, causing the write operation requested by the guest operating system or the application of the virtual machine to be performed on a first disk assigned to the virtual machine, wherein the first disk assigned to the virtual machine is designated for temporary files of the virtual machine; and
  if the write operation requested by the guest operating system or the application of the virtual machine pertains to the persistent data, causing the write operation requested by the guest operating system or the application of the virtual machine to be performed on a second disk assigned to the virtual machine, wherein the second disk assigned to the virtual machine is designated for the persistent data of the virtual machine.

2. The method of claim 1, wherein the disk designated for temporary files is periodically wiped out by a server hosting the virtual machine.

3. The method of claim 1, wherein the first disk and the second disk are of different storage types.

4. A computer-implemented method for a server hosting a plurality of virtual machines, the method comprising:
assigning, by the server, a first storage and a second storage to each of the plurality of virtual machines, the first storage being designated for temporary files of a respective virtual machine and the second storage being designated for persistent data of the respective virtual machine;
monitoring, by the server, events pertaining to the plurality of virtual machines;
upon detecting, by the server, a predefined event pertaining to one of the plurality of virtual machines, causing at least a subset of temporary files to be removed from the first storage of the one of the plurality of virtual machines; and
during a backup or archive operation, causing persistent data from the second storage of the one of the plurality of virtual machines to be copied without copying data from the first storage of the one of the plurality of virtual machines.

5. The method of claim 4, wherein the first storage and the second storage are of different storage types.

6. The method of claim 4, wherein causing at least a subset of the temporary files to be removed from the first storage comprises:
deleting a disk image of the first storage; and
creating a new disk image for the first storage.

7. The method of claim 4, wherein causing at least a subset of the temporary files to be removed from the first storage comprises:
identifying, based on at least one parameter, the at least the subset of temporary files to be removed; and
deleting the at least the subset of the temporary files from an image of the first storage of the one of the plurality of virtual machines.

8. The method of claim 7, wherein the at least one parameter is a date a temporary file was last accessed.

9. The method of claim 4, wherein the predefined event is any one of restarting the at least one virtual machine and shutting down the at least one virtual machine.

10. A system comprising:
data storage to store a plurality of first disks designated for temporary files and a plurality of second disks designated for persistent data; and
a host computing device coupled to the data storage to run a plurality of virtual machines, wherein the host computing device further comprises a temporary files manager operable to
assign a first disk of the plurality of first disks designated for temporary files and a second disk of the plurality of second disks designated for persistent data to each virtual machine,
monitor events pertaining to the plurality of virtual machines,
detect a predefined event pertaining to one of the plurality of virtual machines,
in response to the detected event, cause at least a subset of temporary files to be removed from the first disk of the one of the plurality of virtual machines, and
during a backup or archive operation, cause persistent data from the second storage of the one of the plurality of virtual machines to be copied without copying data from the first storage of the one of the plurality of virtual machines.

11. The system of claim 10, wherein the first disk and the second disk are of different storage types.

12. The system of claim 10, wherein the temporary file manager is to cause at least a subset of the temporary files to be removed from the first disk by:
deleting a disk image of the first disk; and
creating a new disk image for the first disk.

13. The system of claim 10, wherein the temporary file manager is to cause at least a subset of the temporary files to be removed from the first disk by:
identifying, based on at least one parameter, the at least the subset of the temporary files to be removed; and
deleting the at least the subset of the temporary files from an image of the first disk of the one of the plurality of virtual machines.

14. The system of claim 10, wherein the predefined event is any one of restarting a virtual machine and shutting down a virtual machine.

15. A non-transitory computer readable storage medium including instructions that, when executed by a processing system, cause the processing system to perform a method comprising:
assigning, by the server, a first storage and a second storage to each virtual machine, the first storage being designated for temporary files of a respective virtual machine and the second storage being designated for persistent data of the respective virtual machine;
monitoring, by the server, events pertaining to the plurality of virtual machines;
detecting, by the server, a predefined event pertaining to one of the plurality of virtual machines;
causing at least a subset of the temporary files to be removed from the first storage of the one of the plurality of virtual machines; and
during a backup or archive operation, causing the persistent data from the second storage of the one of the plurality of virtual machines to be copied without copying the temporary files from the first storage of the one of the plurality of virtual machines.

16. The computer readable storage medium of claim 15, wherein the first storage and the second storage are of different storage types.

17. The computer readable storage medium of claim 15, wherein causing at least a subset of the temporary files to be removed from the first storage comprises:
deleting a disk image of the first storage; and
creating a new disk image for the first storage.

18. The computer readable storage medium of claim 15, wherein causing at least a subset of the temporary files to be removed from the first storage comprises:
identifying, based on at least one parameter, the at least the subset of temporary files to be removed; and
deleting the at least the subset of the temporary files from an image of the first storage of the one of the plurality of virtual machines.

19. The computer readable storage medium of claim 15, wherein the at least one parameter is a date a temporary file was last accessed.

20. The computer readable storage medium of claim 15, wherein the predefined event is any one of restarting a virtual machine and shutting down a virtual machine.

* * * * *